United States Patent
Wu et al.

(10) Patent No.: US 11,941,854 B2
(45) Date of Patent: Mar. 26, 2024

(54) FACE IMAGE PROCESSING METHOD AND APPARATUS, IMAGE DEVICE, AND STORAGE MEDIUM

(71) Applicant: Beijing SenseTime Technology Development Co., Ltd., Beijing (CN)

(72) Inventors: Wenyan Wu, Beijing (CN); Chen Qian, Beijing (CN); Keqiang Sun, Beijing (CN); Qianyi Wu, Beijing (CN); Yuanyuan Xu, Beijing (CN)

(73) Assignee: Beijing SenseTime Technology Development Co., Ltd., Beijing (CN)

( * ) Notice: Subject to any disclaimer, the term of this patent is extended or adjusted under 35 U.S.C. 154(b) by 455 days.

(21) Appl. No.: 17/203,171

(22) Filed: Mar. 16, 2021

(65) Prior Publication Data

US 2021/0201458 A1 Jul. 1, 2021

Related U.S. Application Data

(63) Continuation of application No. PCT/CN2020/087231, filed on Apr. 27, 2020.

(30) Foreign Application Priority Data

Aug. 28, 2019 (CN) .......................... 201910804179.9

(51) Int. Cl.
*G06T 9/00* (2006.01)
*G06N 3/02* (2006.01)
(Continued)

(52) U.S. Cl.
CPC .............. *G06T 9/002* (2013.01); *G06N 3/02* (2013.01); *G06T 3/00* (2013.01); *G06T 5/50* (2013.01);
(Continued)

(58) Field of Classification Search
CPC .. G06T 9/002; G06T 3/00; G06T 5/50; G06T 7/40; G06T 7/60; G06T 2207/20084;
(Continued)

(56) References Cited

U.S. PATENT DOCUMENTS 8,761,462 B2 6/2014 Sun et al.
2011/0115786 A1* 5/2011 Mochizuki ............ G06T 11/001
345/419

(Continued)

FOREIGN PATENT DOCUMENTS

CN 104036546 A 9/2014
CN 104463777 A 3/2015
(Continued)

OTHER PUBLICATIONS

International Search Report in the international application No. PCT/CN2020/087231, dated Jul. 27, 2020, 2 pgs.
(Continued)

*Primary Examiner* — Phuoc Tran
(74) *Attorney, Agent, or Firm* — Cooper Legal Group, LLC

(57) ABSTRACT

Provided are a face image processing method and apparatus, an image device, and a storage medium. The face image processing method includes: acquiring first-key-point information of a first face image; performing position transformation on the first-key-point information to obtain second-key-point information conforming to a second facial geometric attribute, the second facial geometric attribute being different from a first facial geometric attribute corresponding to the first-key-point information; and performing facial texture coding processing by utilizing a neural network and the second-key-point information to obtain a second face image.

18 Claims, 9 Drawing Sheets

(51) Int. Cl.
*G06T 3/00* (2006.01)
*G06T 5/50* (2006.01)
*G06T 7/40* (2017.01)
*G06T 7/60* (2017.01)
*G06V 10/75* (2022.01)
*G06V 40/16* (2022.01)

(52) U.S. Cl.
CPC ............... *G06T 7/40* (2013.01); *G06T 7/60* (2013.01); *G06V 10/755* (2022.01); *G06V 40/171* (2022.01); *G06T 2207/20084* (2013.01); *G06T 2207/20221* (2013.01); *G06T 2207/30201* (2013.01)

(58) Field of Classification Search
CPC . G06T 2207/20221; G06T 2207/30201; G06T 11/60; G06T 5/006; G06N 3/02; G06V 10/755; G06V 40/171; G06V 40/161
See application file for complete search history.

(56) References Cited

U.S. PATENT DOCUMENTS

| | | | |
|---|---|---|---|
| 2016/0104309 A1 | 4/2016 | Kim et al. | |
| 2017/0076474 A1* | 3/2017 | Fu | G06T 11/00 |
| 2018/0374242 A1 | 12/2018 | Li et al. | |
| 2019/0035149 A1 | 1/2019 | Chen et al. | |
| 2020/0364443 A1* | 11/2020 | Chen | G06V 20/52 |

FOREIGN PATENT DOCUMENTS

| | | |
|---|---|---|
| CN | 105118024 A | 12/2015 |
| CN | 107123083 A | 9/2017 |
| CN | 107767335 A | 3/2018 |
| CN | 108550176 A | 9/2018 |
| CN | 108776983 A | 11/2018 |
| CN | 108961149 A | 12/2018 |
| CN | 108985241 A | 12/2018 |
| CN | 109146774 A | 1/2019 |
| CN | 109272568 A | 1/2019 |
| CN | 109492531 A | 3/2019 |
| CN | 109829930 A | 5/2019 |
| CN | 109859098 A | 6/2019 |
| CN | 109949237 A | 6/2019 |
| CN | 109960974 A | 7/2019 |
| CN | 107123083 B | 8/2019 |
| KR | 20160111376 A | 9/2016 |
| TW | 201828109 A | 8/2018 |
| TW | 201911130 A | 3/2019 |
| WO | 2019050808 A1 | 3/2019 |

OTHER PUBLICATIONS

Office Action of the Indian application No. 202127011815, dated Mar. 30, 2022, 7 pgs.
English translation of the Written Opinion of the International Search Authority in the international application No. PCT/CN2020/087231, dated Jul. 27, 2020 5 pgs.
Second Office Action of the Australian application No. 2020339292, dated Jul. 26, 2022, 4 pgs.
Notice of Allowance of the Chinese application No. 201910804179.9, dated Aug. 1, 2022, 6 pgs.
"Expressive facial style transfer for personalized memes mimic", May 2019, Yanlong Tang, Xiaoguant Han, Yue Li, Liqian Ma and Ruofeng Tong, The Visual Computer, vol. 35, No. 6, pp. 783-795, XP036800824, ISSN: 0178-2789, DOI: 10.1007/S00371-019-01695-6.
Supplementary European Search Report in the European application No. 20859023.2, dated Dec. 3, 2021, 9 pgs.
Notice of Allowance of the Korean application No. 10-2020-7037361, dated Feb. 15, 2022, 4 pgs.
First Office Action of the Chinese application No. 201910804179.9, dated May 5, 2022, 17 pgs.

* cited by examiner

FACE IMAGE PROCESSING METHOD AND APPARATUS, IMAGE DEVICE, AND STORAGE MEDIUM

CROSS-REFERENCE TO RELATED APPLICATION

This application is a continuation of International Patent Application No. PCT/CN2020/087231, filed on Apr. 27, 2020, which claims priority to Chinese Patent Application No. 201910804179.9, filed on Aug. 28, 2019. The disclosures of International Patent Application No. PCT/CN2020/087231 and Chinese Patent Application No. 201910804179.9 are hereby incorporated by reference in their entireties.

TECHNICAL FIELD

The present disclosure relates to the field of information technology, and more particularly, to a face image processing method and apparatus, an image device, and a storage medium.

BACKGROUND

In the process of face image processing, users may try to transform their faces into their favorite faces, specifically, for example, transforming an image of an older face to an image of a younger face. In related art, various neural networks are often used to transform an image of an original face to an image of a target face, but the practice shows that the transformation is often accompanied by such transformation that is not desired by a user, resulting in degraded transformation effect.

SUMMARY

A first aspect of the present disclosure provides a method for face image processing, which may include: acquiring first-key-point information of a first face image; performing position transformation on the first-key-point information to obtain second-key-point information conforming to a second facial geometric attribute, the second facial geometric attribute being different from a first facial geometric attribute corresponding to the first-key-point information; and performing facial texture coding processing by utilizing a neural network and the second-key-point information to obtain a second face image.

A second aspect of the present disclosure provide an apparatus for face image processing, which may include: a first acquisition module, configured to acquire first-key-point information of a first face image; a transformation module, configured to perform position transformation on the first-key-point information to obtain second-key-point information conforming to a second facial geometric attribute, the second facial geometric attribute being different from a first facial geometric attribute corresponding to the first-key-point information; and a coding module, configured to perform facial texture coding processing by utilizing a neural network and the second-key-point information to obtain a second face image.

A third aspect of the present disclosure provides a computer storage medium, which may store computer-executable instructions. The computer-executable instructions may be executed to implement the operations of the method provided by any one of the foregoing technical solutions in the first aspect.

A fourth aspect of the present disclosure provides an image device, which may include: a memory; and a processor, connected to the memory, and configured to implement the operations of the method provided by any one of the foregoing technical solutions in the first aspect by executing computer-executable instructions stored on the memory.

DETAILED DESCRIPTION

The technical solutions of the present disclosure are further described below in detail in combination with the accompanying drawings and specific embodiments of the specification.

Figure 1:
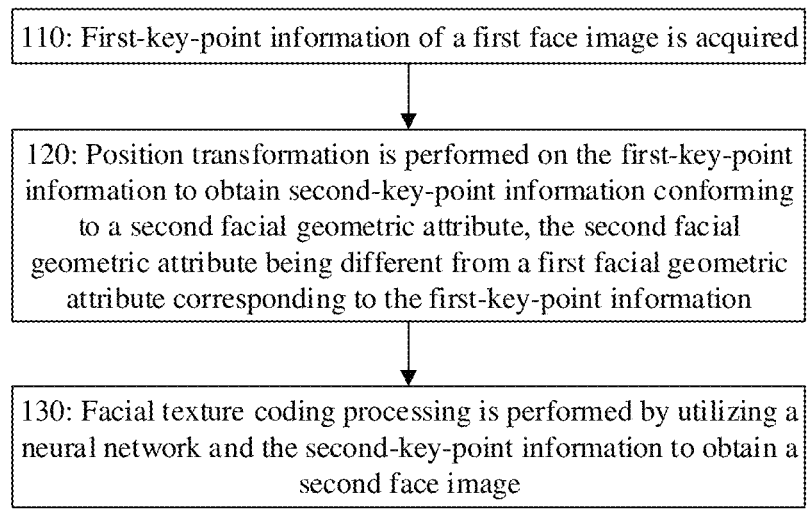
FIG. 1 is a schematic flowchart of a face image processing method according to an embodiment of the present disclosure.

As shown in FIG. 1, the present embodiment provides a face image processing method, which includes the following operations.

In operation 110, first-key-point information of a first face image is acquired.

In operation 120, position transformation is performed on the first-key-point information to obtain second-key-point information conforming to a second facial geometric attribute, the second facial geometric attribute being different from a first facial geometric attribute corresponding to the first-key-point information.

In operation 130, facial texture coding processing is performed by utilizing a neural network and the second-key-point information to obtain a second face image.

The face image processing method provided by the embodiments of the present disclosure may be applied to various image devices, and the image devices may include various terminal devices and servers with information processing capability. The terminal device may include: mobile phones, tablet computers, wearable equipment and the like. The servers may be servers that perform image processing.

It will be appreciated that the first face image is an image containing an original face. In some embodiments, the operation 110 of acquiring the first-key-point information of the first face image may include: the first face image is detected by using a neural network to obtain information of multiple first key points representing first facial geometric attributes of a face in the first face image. For example, information of 106 first key points representing the face in the first face image may be obtained, and position information of the 106 key points in the first face image may be obtained from the first-key-point information. Information of different first key points at least contains information of different positions.

In some embodiments, the first-key-point information may include: position information of each key point in the first face image. The position information includes, but is not limited to, coordinates of key points in the first face image. In some embodiments, the coordinates of the key points in the first face image are pixel-level coordinates, so that the face transformation performed based on the first-key-point information to obtain the second face image can be pixel-level face transformation, and the pixel-level face transformation has high fineness.

In some embodiments, the first-key-point information may further include: key point identifiers corresponding to key points. The key point identifiers may represent key points of different parts of a face. For example, a key point identifier corresponding to a key point of zygomatic is different from a key point identifier corresponding to a key point of chin. The key point identifier includes, but is not limited to, a key point serial number and/or a key point name.

In some embodiments of the present disclosure, the key points corresponding to the first-key-point information may include at least one of the following: key points of facial contour and key points of facial features. The key points of facial contour may be key points of outer contour of the face. The key points of facial features may include, for example, key points of eyes, key points of the nose, key points of the lip and the like.

The positions of the key points contained in the above first-key-point information and relative position relationships between the key points determine a shape of the face in the first face image, and the shape represents a facial geometric attribute (that is, a first facial geometric attribute) of the face.

The position transformation based on the first-key-point information is performed in the operation 120, so that transformation of the first facial geometric attribute corresponding to the first-key-point information can be realized, and second-key-point information conforming to the second facial geometric attribute is obtained after the position transformation.

In some embodiments of the present disclosure, position transformation may be performed for the first-key-point information based on facial-geometric-attribute transformation parameters. For example, the facial-geometric-attribute transformation parameters may be, for example, a transformation matrix. The first-key-point information is taken as a known quantity, the transformation matrix and the first-key-point information are used for operation to obtain updated coordinates, and the updated coordinates are taken as the second-key-point information.

In this way, the transformation from the first-key-point information to the second-key-point information in the operation 120 is equivalent to transformation from the facial geometric attribute of an original face to the facial geometric attribute of a target face, instead of transformation using a neural network. The uncontrollable factors brought by transformation of the facial geometric attribute of the original face by using the neural network are reduced, so that the transformation effect and robustness of a face image are improved.

In some embodiments of the present disclosure, in the operation 130, the facial texture coding includes, but is not limited to, skin texture coding, wrinkle texture coding, and hair texture coding.

In some embodiments, areas between different key points to which the second-key-point information corresponds may correspond to different parts of the face. For example, an area between the key points of the zygomatic and the key points of the nose is a submalar triangle area, and an area between the key points of the lip and the key points of the chin is a chin area. The colors and/or textures of skin areas in different parts are different; and/or, wrinkle textures of different skin areas are different. Based on this, skin texture codes of corresponding areas of different parts of the face may be different, wrinkle texture codes of corresponding areas of different parts of the face may be different, and hair texture codes of corresponding areas of different parts of the face may be different. As an example, an area of brows needs to be coded to form eyebrows, and thus texture codes of an eyebrow area are different from skin texture codes.

Thus, in the embodiments of the present disclosure, in the face transformation process from the original face in the first face image to the target face in the second face image, the transformation of the facial geometric attribute can be performed in a different way from the transformation of the texture attribute of the face, thereby reducing the phenomenon of poor transformation effect caused by uniformly processing the facial geometric attribute and the texture attribute through a neural network, improving the face transformation effect, and ensuring the robustness of the face transformation. For example, the phenomenon that the shapes of face edges, eyeballs and other positions may be got strange when the neural network is uniformly used for transforming an original face to obtain a target face is reduced, and thus the transformation effect is improved.

In some embodiments, after the operation 120, the method may further include the following operations.

In operation 121, the first face image is adjusted based on the second-key-point information to obtain a third face image.

In the present embodiment, after the second-key-point information is obtained, the first face image may be adjusted based on the second-key-point information to obtain the third face image.

For example, the image device may directly perform pixel-level transformation processing on the first face image so as to obtain a third face image after the coordinate of the first-key-point information is changed. For example, each key point corresponding to the first-key-point information of the first face image may be adjusted towards the direction of each key point corresponding to the second-key-point information, so that the first face image can be adjusted, and the third face image can be obtained.

It will be appreciated that the facial geometric attribute of the face in the third face image is changed with respect to the one of the original face in the first face image.

For example, the facial geometric attribute may include at least one of the following: shapes of facial features and relative positions of the facial features. The shapes of the facial features may include, for example, the shape of the eyes, the shape of the nose or the shape of the lip, etc.; the relative positions of the facial features may include, for example, a distance between the eyes, a distance between the nose and the lip, a contour line of the face, hairline, the shape of hair, etc.

Figure 2:
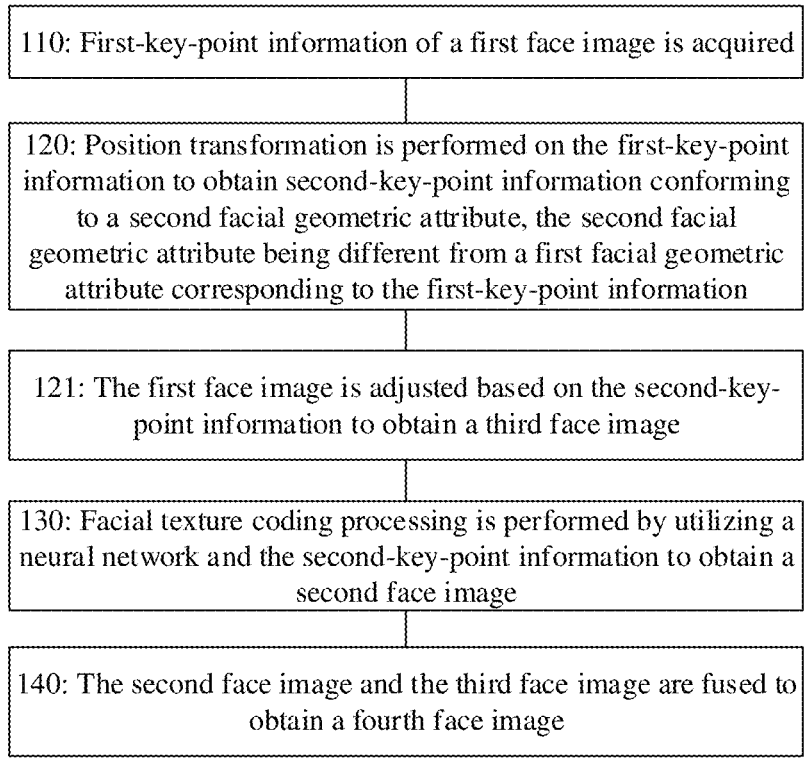
FIG. 2 is a schematic flowchart of a face image processing method according to an embodiment of the present disclosure.

In some embodiments, as shown in FIG. 2, after the operation 120, the method further includes the following operations.

In operation 140, the second face image and the third face image are fused to obtain a fourth face image.

In the present embodiment, loss of some details may occur during the generation of the second face image by the facial texture coding processing, such as loss of fine lines in the skin. In order to improve the transformation effect of the face image, the second face image and the third face image are fused. At least part of lost details in the second face image can be supplemented with reserved details in the third face image after fusion, so that a fourth face image with better image quality than the second face image is obtained.

In some embodiments, the fusion of the second face image and the third face image may include at least one of the following modes.

Mode 1: weighted average values are calculated for pixels of the second face image and the third face image one by one to obtain values of all the pixels in the fourth face image.

Mode 2: a specific area in the second face image, where a difference between a color value and a predetermined color value is larger than a threshold, is determined, and the color value of the specific area in the second face image is replaced with a color value of a specific area in the third face image.

It should be noted that there are various modes of fusing the second face image and the third face image. The above are only two modes. The present embodiment is not limited to the above-mentioned modes for image fusion.

In some embodiments, the method may further include: the displayed first face image is replaced with the fourth face image. Thus, after the displayed first face image is replaced with the fourth face image, a face image subjected to facial geometric attribute and texture attribute transformation can be obtained.

In some embodiments, the first face image may be obtained after an original image is segmented. The method may further include: the first face image in the predetermined image (i.e., the original image) is replaced with the fourth face image.

In some embodiments, the fourth face image may be fused with a background area other than the first face image in the predetermined image to generate an updated image. The updated image contains the same background as the predetermined image, but the face image has been transformed from the first face image to the fourth face image.

In some embodiments, the method may further include: the displayed first face image is replaced with the second face image. This embodiment is suitable for a scenario that the third face image and/or the fourth face image are not generated. The displayed first face image may be directly replaced with the second face image.

In the above embodiments, the displayed image may be a complete image or video frame. The first face image may be a portion of an image area in the complete image or video frame.

In some embodiments, after position transformation is performed on the first-key-point information based on the facial-geometric-attribute transformation parameters of the face according to the desired second facial geometric attribute of the target face to obtain the second-key-point information, the operation 130 may include the following operations.

A mask map of a target face may be generated based on the second-key-point information. Pixels in a face image area in the mask map are a first predetermined value, pixels outside the face image area are a second predetermined value, and the face image area is defined by each second key point describing a facial contour. The mask map and the first face image may be fused to generate a fifth face image. The face image area in the first face image may be reserved in the fifth face image. A contour map of geometric attributes of a target face may be generated based on the second-key-point information. Pixels on a contour line of each part in the contour map are a third predetermined value, pixels other than the pixels on the contour line of each part are a fourth predetermined value, and the contour line of each part is defined by second key points describing each face part. The fifth face image and the contour map may be input into the neural network for facial texture coding to obtain the second face image.

Values of pixels in the face image area in the mask map are a first predetermined value. Values of pixels outside the face image area are a second predetermined value. The second predetermined value is different from the first predetermined value. For example, the first predetermined value is "1" and the second predetermined value is "0".

In some embodiments, the mask map and the contour map may be input directly to the neural network through which the second face image may be output.

In other embodiments, in order to improve the image quality of the second face image, the mask map may be further fused with the first face image to obtain a fifth face image. The generation mode of the fifth face image may include: the values of pixels of the face image area in a mask image are replaced with the values of pixels of the face image area in the first face image to obtain a fifth face image.

Figure 3A:
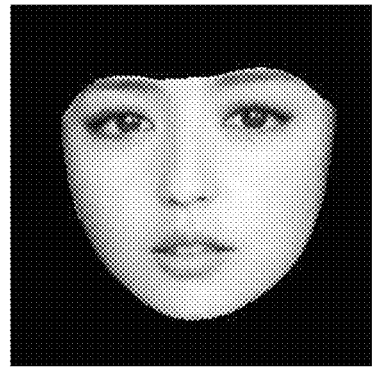
FIG. 3A is a schematic diagram of a mask map according to an embodiment of the present disclosure.

For example, FIG. 3A is a schematic diagram of a fifth face image.

Compared with the mask map, the values of the pixels of the face area of the fifth face image are no longer a single first predetermined value. The values of pixels of the face area in the first face image may be any positive number that is not zero.

The contour line of each part may include at least one of the following: a contour line of face, a contour line of eyebrow, a contour line of eyes, a contour line of nose, and a contour line of mouth.

There are various types of contour map. Several contour maps are provided below for option.

One is a thermodynamic map. For example, in the thermodynamic map, the width of the contour line of each part may be a predetermined number of pixels, and the predetermined number may be one or more than one. For example, there are predetermined 2 to 5 pixels. In the thermodynamic map of facial geometric attributes of a target facial contour, in an area where the contour line is located, a value of a pixel closer to a position where a contour pixel is located is larger; and in the area where the contour line is located, a value of a pixel further away from the position where the contour pixel is located is smaller. A value of a pixel outside the area where the contour line is located may be "0". A number of values may be taken for a third predetermined value in the thermodynamic map, depending on the distance from the contour pixel.

Figure 3B:
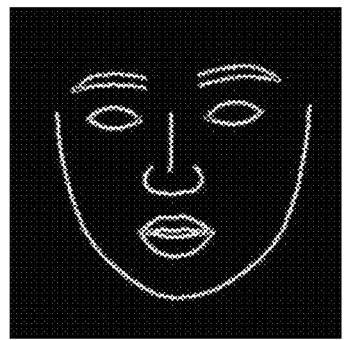
FIG. 3B is a schematic diagram of a thermodynamic map according to an embodiment of the present disclosure.

Another one is a connection map. The connection map is an image formed by key point connection lines corresponding to the second-key-point information. For example, values of pixels that a connection line passes through in the connection map are a third predetermined value, and values of pixels that the connection line does not pass through are a fourth predetermined value. The third predetermined value is different from the fourth predetermined value. FIG. 3B is a schematic diagram of a connection map of a contour. In FIG. 3B, the third predetermined value may be a value of a white pixel, and the fourth predetermined value may be a value of a black pixel. The width of a contour in the connection map also may be one or more pixels.

Figure 4:
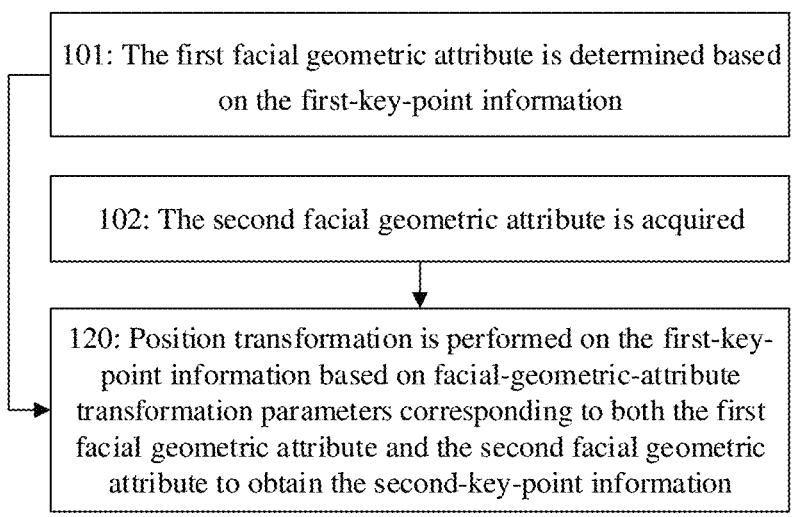
FIG. 4 is a schematic flowchart of a face image processing method according to an embodiment of the present disclosure.

In some embodiments, as shown in FIG. 4, the method further includes the following operations.

In operation 101, the first facial geometric attribute is determined based on the first-key-point information.

In operation 102, the second facial geometric attribute is acquired.

The operation 120 may include: position transformation is performed on the first-key-point information based on facial-geometric-attribute transformation parameters corresponding to both the first facial geometric attribute and the second facial geometric attribute to obtain the second-key-point information.

For example, the shape of the original face in the first face image may be approximately square (i.e., a square face), but a desired face shape is a melon-seed shape (i.e., an oval-shape face). A first facial geometric attribute of the face in the first face image can be determined by extracting the first-key-point information, and a second facial geometric attribute may be determined based on a user input or a current transformation scene. For example, the current scene is rejuvenation, a younger face may be somewhat rounded relative to an older face. In summary, the second facial geometric attribute of the target face may be determined in a variety of ways, not limited to the examples described above.

Figure 5A:
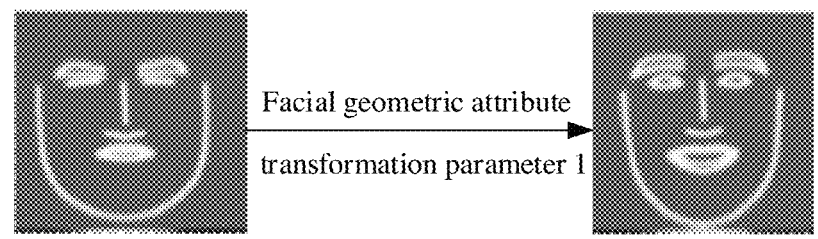
FIG. 5A is a schematic diagram of transformation of facial-geometric-attribute transformation parameters of a face according to an embodiment of the present disclosure.
Figure 5B:
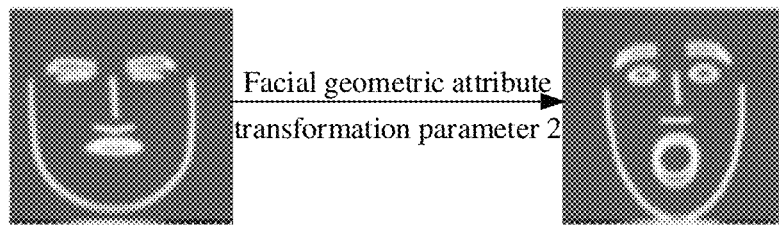
FIG. 5B is a schematic diagram of transformation of facial-geometric-attribute transformation parameters of a face according to an embodiment of the present disclosure.
Figure 5C:
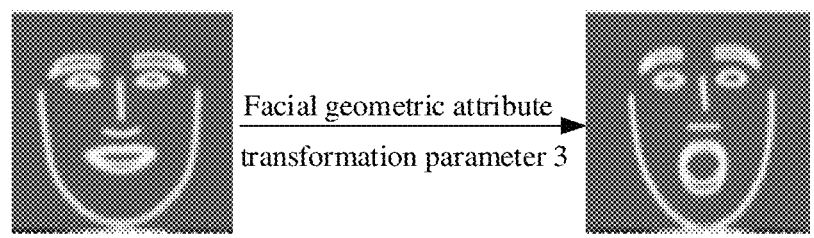
FIG. 5C is a schematic diagram of transformation of facial-geometric-attribute transformation parameters of a face according to an embodiment of the present disclosure.

Referring to FIGS. 5A to 5C, FIG. 5A shows that a square face may be transformed into a goose-egg-shape face by facial-geometric-attribute transformation parameter 1. FIG. 5B shows that a square face may be transformed into an oval-shape face by facial-geometric-attribute transformation parameter 2. FIG. 5C shows that a goose-egg-shape face is transformed into an oval-shape face by facial-geometric-attribute transformation parameter 3.

The facial-geometric-attribute transformation parameter 1 is different from the facial-geometric-attribute transformation parameter 2; the facial-geometric-attribute transformation parameter 2 is different from the facial-geometric-attribute transformation parameter 3; and the facial-geometric-attribute transformation parameter 3 is different from the facial-geometric-attribute transformation parameter 1.

After the first facial geometric attribute and the second facial geometric attribute are determined, a geometric-attribute transformation relation required to be used can be determined. The facial-geometric-attribute transformation parameters are determined, and the first-key-point information may be subjected to position transformation based on the facial-geometric-attribute transformation parameters to obtain the second-key-point information.

In some embodiments, different first facial geometric attributes correspond to different facial-geometric-attribute transformation parameters. For example, a round face and a square face respectively need to be transformed into an oval-shape face, and facial-geometric-attribute transformation parameters adopted by the round face and the square face are different.

In other embodiments, different second facial geometric attributes correspond to different facial-geometric-attribute transformation parameters. For example, the transformation of a round face into an oval-shape face or a goose-egg-shape face respectively requires different facial-geometric-attribute transformation parameters.

In the face image processing process, corresponding to different first facial geometric attributes and second facial geometric attributes, different facial-geometric-attribute transformation parameters may be set, and high-quality transformation between faces with different facial geometric attributes can be realized.

In some embodiments, the operation 130 may include: a contour map of geometric attributes of a target face is generated based on the second-key-point information, values of pixels on a contour line of each part in the contour map being a third predetermined value, values of pixels other than the pixels on the contour line of each part being a fourth predetermined value, and the contour line of each part being defined by second key points describing each face part; and the contour map is input into the neural network for facial texture coding to obtain the second face image. The texture of the second face image generated in this way may be different from that of the first face image and this way may also be used for facial attribute transformation.

In the present embodiment, facial texture coding processing may be performed based on a neural network to obtain a second face image. In some embodiments, the neural network may be a generation network, i.e., facial texture coding processing is performed through the generation network to obtain a second face image.

Figure 6:
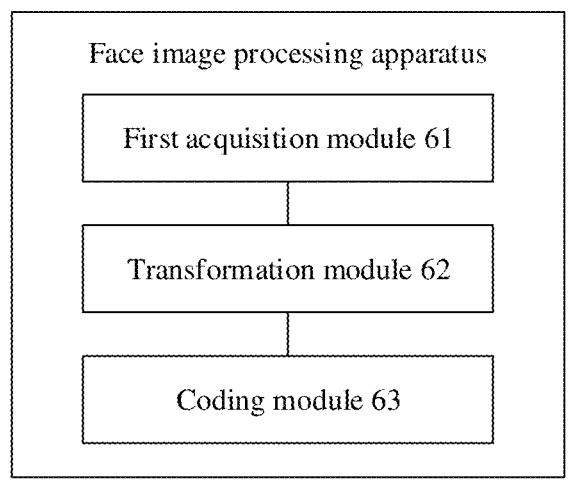
FIG. 6 is a schematic structure diagram of a face image processing apparatus according to an embodiment of the present disclosure.

Based on the above embodiments, the embodiments of the present disclosure also provide a face image processing apparatus. As shown in FIG. 6, the present embodiment provides a face image processing apparatus, which includes a first acquisition module 110, a transformation module 120, and a coding module 130.

The first acquisition module 110 is configured to acquire first-key-point information of a first face image.

The transformation module 120 is configured to perform position transformation on the first-key-point information to obtain second-key-point information conforming to a second facial geometric attribute, the second facial geometric attribute being different from a first facial geometric attribute corresponding to the first-key-point information.

The coding module 130 is configured to perform facial texture coding processing by utilizing a neural network and the second-key-point information to obtain a second face image.

In some embodiments, the first acquisition module 110, the transformation module 120, and the coding module 130 may be program modules; after the program module is executed by a processor, the operations of acquiring the first-key-point information, transforming the first-key-point information to the second-key-point information, performing facial texture coding and the like can be implemented.

In other embodiments, the first acquisition module 110, the transformation module 120, and the coding module 130 may be combined modules of software and hardware. The combination modules of software and hardware include, but are not limited to, programmable arrays. The programmable arrays include, but are not limited to, complex programmable arrays or field programmable arrays.

In other embodiments, the first acquisition module 110, the transformation module 120, and the coding module 130 may be pure hardware modules. The pure hardware modules include, but are not limited to, application-specific integrated circuits.

In some embodiments, the apparatus may further include a fusion module.

The transformation module 120 is further configured to, after performing position transformation on the first-key-point information to obtain the second-key-point information conforming to the second facial geometric attribute, adjust the first face image based on the second-key-point information to obtain a third face image.

The fusion module is configured to, after the coding module 130 performs facial texture coding processing by utilizing the neural network and the second-key-point information to obtain the second face image, fuse the second face image and the third face image to obtain a fourth face image.

In some embodiments, the apparatus may further include: a first replacement module, configured to replace the displayed first face image with the fourth face image or the second face image.

In some embodiments, the first face image may be contained in a predetermined image. The apparatus may further include: a generation module, configured to fuse the fourth face image with a background area other than the first face image in the predetermined image to generate an updated image.

In some embodiments, the coding module 130 is configured to: generate a mask map of a target face based on the second-key-point information, values of pixels in a face image area in the mask map being a first predetermined value, values of pixels outside the face image area being a second predetermined value, and the face image area being defined by each second key point describing a facial contour; fuse the mask map and the first face image to generate a fifth face image, the face image area in the first face image being reserved in the fifth face image; generate a contour map of geometric attributes of a target face based on the second-key-point information, values of pixels on a contour line of each part in the contour map being a third predetermined value, values of pixel other than the pixels on the contour line of each part being a fourth predetermined value, and the contour line of each part being defined by second key points describing each face part; and input the mask map and the contour map into the neural network for facial texture coding to obtain the second face image.

In some embodiments, the apparatus may further include: a determination module, configured to determine the first facial geometric attribute based on the first-key-point information; and a second acquisition module.

The second acquisition module is configured to acquire a second geometric attribute of a target face.

The transformation module 120 is configured to perform position transformation on the first-key-point information based on facial-geometric-attribute transformation parameters corresponding to both the first facial geometric attribute and the second facial geometric attribute to obtain the second-key-point information.

In some embodiments, different first facial geometric attributes correspond to different facial-geometric-attribute transformation parameters; and/or different second facial geometric attributes correspond to different facial-geometric-attribute transformation parameters.

In some embodiments, the coding module 130 is configured to: generate a contour map of geometric attributes of a target face based on the second-key-point information, values of pixels on a contour line of each part in the contour map being a third predetermined value, values of pixels other than the pixels on the contour line of each part being a fourth predetermined value, and the contour line of each part being defined by second key points describing each face part; and input the contour map into the neural network for facial texture coding to obtain the second face image.

Several specific examples are provided below in combination with any of the above embodiments:

Example 1

In the face generation process, face transformation which is guided by defining or selecting new attributes has strong practicability, for example, a photograph of an adult female is specified to generate a photograph of a younger face.

Aiming at the problem of facial attribute change, a corresponding facial attribute generation scheme is proposed based on both facial geometric attributes (information of facial key points) and facial texture attributes. Through separate processing of geometric attributes and texture attributes, a model of transformation of facial geometric attributes can be better controlled aiming at different attributes, and the first-key-point information can be more accurately transformed into the second-key-point information. Facial texture coding processing is performed utilizing the neural network and the second-key-point information to obtain a second face image subjected to transformation of the facial geometric attribute.

Example 2

Figure 7:
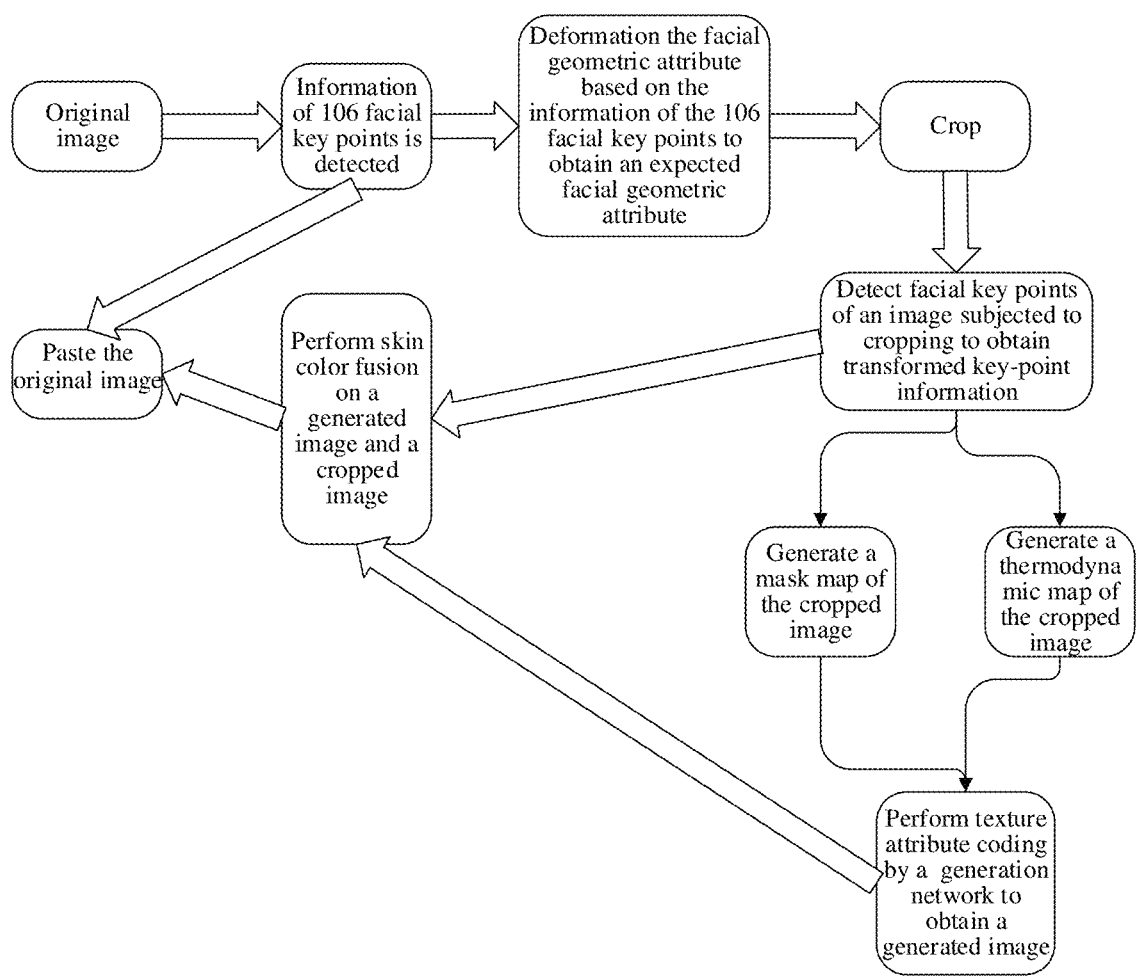
FIG. 7 is a schematic flowchart of a face image processing method according to an embodiment of the present disclosure.

As shown in FIG. 7, the face image processing method provided by the embodiments of the present disclosure may include the following operations.

Firstly, an attribute transformation module is provided for different facial geometric attributes for acquiring shape information of a face in a current image. With regard to an input original image (the original image here is equivalent to the first face image), a facial geometric attribute (equivalent to a first facial geometric attribute) of a face is obtained by extracting information (equivalent to first-key-point information) of 106 facial key points and combining the information of the 106 facial key points. The facial geometric attributes here may be shape information of the face. Corresponding position transformation may be performed on the current key-point information according to facial geometric attributes expected to be generated. A generation constraint of facial shape transformation may be provided based on facial-geometric-attribute transformation parameters, and a face image obtained based on position transformation of key points may be the foregoing third face image.

Secondly, after the initial constraint of the geometric attribute of a target face after deformation is obtained, textures may be generated utilizing a neural network (for example, a generation network), so that the facial texture coding processing of corresponding attributes can be generated, and an image obtained through the facial texture coding processing may be the foregoing second face image.

Then, the generated face image may be further processed. In order to solve the problem that the generated face may be unnatural at edges, eyes and the like, an image processing mode is utilized to fuse an input third face image and an output second face image of a network to serve as a final output result.

As shown in FIG. 7 the face image processing method may specifically include the following operations.

A network for detecting information of facial key points may be constructed, information of 106 facial key points of an input image may be obtained by regression, position transformation may be performed on the key-point information, geometric deformation may be performed on the input face image based on the transformed key-point information, and a face image which accords with shape constraint of expected attributes may be output. The face image output here may be the foregoing third face image.

Transformation of facial geometric attributes may be performed based on the information of the 106 facial key points to obtain expected facial geometric attributes. The facial geometry attributes may be presented in an intermediate image transformed from the original image.

The intermediate image may be cropped to obtain an image area containing the transformed face, thereby obtaining a cropped image.

Key-point information detection may be performed on of the face in the cropped image. The information of the facial key points may also be directly obtained based on transformation without re-detection. The re-detection is only for further ensuring accuracy.

Facial detection may be performed based on the cropped image, to generate a mask map of the cropped image and a thermodynamic map of the cropped image.

The mask map and the corresponding thermodynamic map may be input into a neural network (for example, a generation network), texture code may be obtained using a coder, and an attribute generation result which accords with both the shape constraint and the texture constraint may be generated based on the shape code of the thermodynamic map corresponding to the key-point information, i.e., a generated image is obtained. Herein, the generated image is equivalent to the foregoing second face image.

Skin color fusion may be performed on the cropped image and the generated image, and image fusion may be performed to make up for the inaccuracy in details possibly generated when the network generates the image. The background information and the generated face may be integrated in a map pasting mode to obtain a fused face image as a final output. The fused face image is equivalent to the foregoing fourth face image.

The original image is replaced with the fused face image which is then fused with the background outside the face image area in the original image to form a new image.

Figure 8:
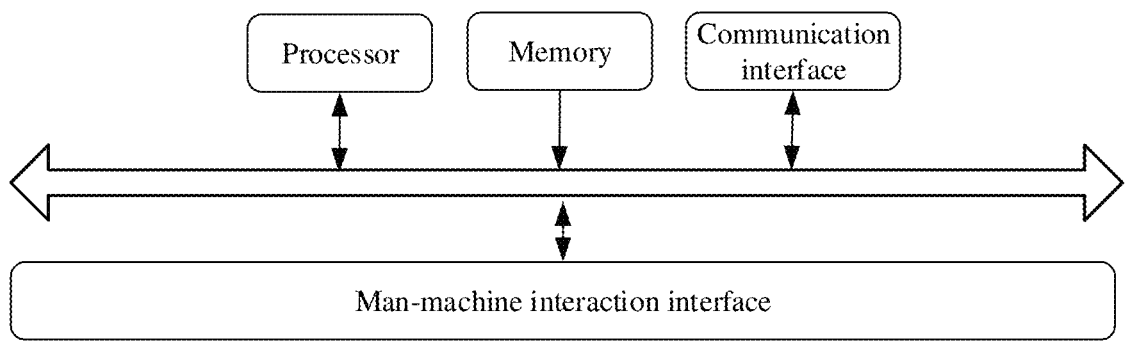
FIG. 8 is a schematic structure diagram of an image device according to an embodiment of the present disclosure.

Based on the foregoing embodiments, the embodiments of the present disclosure also provide an image device. As shown in FIG. 8, the present embodiment provides an image device, which includes: a memory; and a processor connected to the memory and configured to implement the face image processing method provided in one or more of the foregoing embodiments by executing computer-executable instructions on the memory, for example, one or more of the face image processing methods shown in FIGS. 1 to 4 and 7.

The memory may be various types of memory, which may be a Random Access Memory (RAM), a Read-Only Memory (ROM) and a flash memory, etc. The memory may be configured to store information, for example, store computer-executable instructions, etc. The computer-executable instructions may be various program instructions, such as a target program instruction and/or a source program instruction.

The processor may be various types of processors, such as a central processor, a microprocessor, a digital signal processor, a programmable array, a digital signal processor, an application-specific integrated circuit, or an image processor.

The processor may be connected to the memory through a bus. The bus may be an integrated circuit bus, etc.

In some embodiments, the image device may further include: a communication interface. The communication interface may include: a network interface such as a local area network interface, a transceiver antenna, etc. The communication interface may be also connected to the processor and configured to transceive information.

In some embodiments, the image device may further include a man-machine interaction interface. For example, the man-machine interaction interface may include various input/output devices, such as a keyboard and a touch screen.

An embodiment of the present disclosure provides a computer storage medium, which stores computer-executable instructions. The computer-executable instructions may be executed to implement the face image processing method provided in one or more of the foregoing embodiments, for example, one or more of the face image processing methods shown in FIGS. 1 to 4 and 7.

The computer storage medium may include various recording media with recording functions, for example, various storage media such as a CD, a floppy disk, a hard disk, a magnetic tape, an optical disk, a U disk, or a mobile hard disk. The computer storage medium may be a non-transitory storage medium, and the computer storage medium may be read by a processor, so that after the computer-executable instructions stored on the computer storage medium can be acquired and executed by the processor, the information processing method provided by any one of the foregoing technical solutions can be implemented, for example, the information processing method applied in a terminal or the information processing method in an application server can be performed.

An embodiment of the present disclosure provides a computer program product, which stores computer-executable instructions. The computer-executable instructions may be executed to implement the face image processing method provided in one or more of the foregoing embodiments, for example, one or more of the face image processing methods shown in FIGS. 1 and 2.

A computer program tangibly stored in a computer storage medium may be included. The computer program includes program codes for executing the methods shown in the flowchart. The program codes may include corresponding instructions for correspondingly performing the method operations provided by the embodiments of the present disclosure.

According to the technical solution provided by the embodiments of the present disclosure, during transformation of an original face in a first face image, obtaining second-key-point information by subjecting first-key-point information to position transformation is equivalent to converting a first facial geometric attribute of the face in the first face image into a second facial geometric attribute. After the transformation of the facial geometric attribute is completed, facial texture coding is performed using a neural network and the second-key-point information, so that separation of the texture attribute coding from the geometric attribute transformation is realized. Compared with uniform implementation of the geometric attribute transformation and the texture attribute transformation based on a depth learning model, separate implementation of the two can reduce randomness of the depth learning model during geometric transformation, and improve the quality and robustness of the face image transformation.

In the several embodiments provided in the present disclosure, it should be understood that the disclosed devices and methods may be implemented in other manners. The device embodiments described above are only schematic. For example, division of the units is only logic function division, and other division manners may be adopted during practical implementation. For example, multiple units or components may be combined or integrated into a system, or some characteristics may be neglected or not executed. In addition, coupling or direct coupling or communication connection between discussed components may be indirect coupling or communication connection, implemented through some interfaces, of the device or the units, which may be electrical and mechanical or adopt other forms.

The units described as separate parts may be or may not be physically separated, and parts displayed as units may be or may not be physical units, and namely may be located in the same place, or may also be distributed to multiple network units. Part of all of the units may be selected according to a practical requirement to achieve the purposes of the solutions of the present embodiment.

In addition, each function unit in each embodiment of the present disclosure may be integrated into a processing module, each unit may also exist independently, and two or more than two units may also be integrated into one unit. The integrated unit may be implemented in a hardware form, and may also be implemented in form of hardware and software function unit.

The technical features in any embodiments of the present disclosure may be arbitrarily combined to form a new method embodiment or a device embodiment without conflict.

The method embodiments in any embodiment of the present disclosure may be arbitrarily combined to form a new method embodiment without conflict.

The device embodiments in any embodiment of the present disclosure may be arbitrarily combined to form a new device embodiment without conflict.

Those of ordinary skill in the art should know that: all or part of the operations of the above method embodiment may be implemented by instructing related hardware through a program, the above program may be stored in a computer-readable storage medium, and the program is executed to execute the operations of the above method embodiment; and the storage medium includes: various media capable of storing program codes such as mobile storage equipment, a ROM, a RAM, a magnetic disk or an optical disc.

The above are only the specific implementation modes of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subjected to the scope of protection of the claims.

The invention claimed is:

1. A method for face image processing, comprising:
acquiring first-key-point information of a first face image;
performing position transformation on the first-key-point information to obtain second-key-point information conforming to a second facial geometric attribute, the second facial geometric attribute being different from a first facial geometric attribute corresponding to the first-key-point information; and
performing facial texture coding processing by utilizing a neural network and the second-key-point information to obtain a second face image,
wherein performing facial texture coding processing by utilizing the neural network and the second-key-point information to obtain the second face image comprises:
generating a mask map of a target face based on the second-key-point information, values of pixels in a face image area in the mask map being a first predetermined value, values of pixels outside the face image area being a second predetermined value, and the face image area being defined by each second key point describing a facial contour;
fusing the mask map and the first face image to generate a fused face image, the face image area in the first face image being reserved in the fused face image;
generating a contour map of geometric attributes of the target face based on the second-key-point information, values of pixels on a contour line of each part in the contour map being a third predetermined value, values of pixels other than the pixels on the contour line of each part being a fourth predetermined value, and the contour line of each part being defined by second key points describing each face part; and
inputting the fused face image and the contour map into the neural network for facial texture coding to obtain the second face image.

2. The method according to claim 1, wherein
after performing position transformation on the first-key-point information to obtain the second-key-point information conforming to the second facial geometric attribute, the method further comprises: adjusting the first face image based on the second-key-point information to obtain a third face image; and
after performing facial texture coding processing by utilizing the neural network and the second-key-point information to obtain the second face image, the method further comprises:
fusing the second face image and the third face image to obtain a fourth face image.

3. The method according to claim 2, further comprising:
replacing the first face image with the fourth face image or the second face image.

4. The method according to claim 1, wherein the first face image is contained in a predetermined image, the method further comprising:
fusing a fourth face image with a background area other than the first face image in the predetermined image to generate an updated image.

5. The method according to claim 1, further comprising:
determining the first facial geometric attribute based on the first-key-point information; and
acquiring the second facial geometric attribute;
wherein performing position transformation on the first-key-point information to obtain the second-key-point information conforming to the second facial geometric attribute comprises:
performing position transformation on the first-key-point information based on geometric attribute transformation parameters corresponding to both the first facial geometric attribute and the second facial geometric attribute to obtain the second-key-point information.

6. The method according to claim 5, wherein at least one of different first facial geometric attributes correspond to different geometric attribute transformation parameters; or different second facial geometric attributes correspond to different geometric attribute transformation parameters.

7. The method according to claim 1, wherein performing facial texture coding processing by utilizing the neural network and the second-key-point information to obtain the second face image further comprises:
inputting the contour map into the neural network for facial texture coding to obtain the second face image.

8. An apparatus for face image processing, comprising:
a processor; and
a memory configured to store instructions executable by the processor;
wherein the processor is configured to:
acquire first-key-point information of a first face image;
perform position transformation on the first-key-point information to obtain second-key-point information conforming to a second facial geometric attribute, the second facial geometric attribute being different from a first facial geometric attribute corresponding to the first-key-point information; and
perform facial texture coding processing by utilizing a neural network and the second-key-point information to obtain a second face image,
wherein the processor is further configured to:
generate a mask map of a target face based on the second-key-point information, values of pixels in a face image area in the mask map being a first predetermined value, values of pixels outside the face image area being a second predetermined value, and the face image area being defined by each second key point describing a facial contour;
fuse the mask map and the first face image to generate a fused face image, the face image area in the first face image being reserved in the fused face image;
generate a contour map of geometric attributes of the target face based on the second-key-point information, values of pixels on a contour line of each part in the contour map being a third predetermined value, values of pixels other than the pixels on the contour line of each part being a fourth predetermined value, and the contour line of each part being defined by second key points describing each face part; and
input the fused face image and the contour map into the neural network for facial texture coding to obtain the second face image.

9. The apparatus according to claim 8, wherein the processor is further configured to:
after performing position transformation on the first-key-point information to obtain the second-key-point information conforming to the second facial geometric attribute, adjust the first face image based on the second-key-point information to obtain a third face image; and
after performing facial texture coding processing by utilizing the neural network and the second-key-point information to obtain the second face image, fuse the second face image and the third face image to obtain a fourth face image.

10. The apparatus according to claim 9, wherein the processor is further configured to:
replace the first face image with the fourth face image or the second face image.

11. The apparatus according to claim 8, wherein the first face image is contained in a predetermined image, and the processor is further configured to:
fuse a fourth face image with a background area other than the first face image in the predetermined image to generate an updated image.

12. The apparatus according to claim 8, wherein the processor is further configured to:
determine the first facial geometric attribute based on the first-key-point information;
acquire the second facial geometric attribute of the target face, and
perform position transformation on the first-key-point information based on geometric attribute transformation parameters corresponding to both the first facial geometric attribute and the second facial geometric attribute to obtain the second-key-point information.

13. The apparatus according to claim 12, wherein at least one of different first facial geometric attributes correspond to different geometric attribute transformation parameters; or different second facial geometric attributes correspond to different geometric attribute transformation parameters.

14. The apparatus according to claim 8, wherein the processor is further configured to:
input the contour map into the neural network for facial texture coding to obtain the second face image.

15. A non-transitory computer storage medium, storing computer-executable instructions that, when executed, cause a computer to implement operations comprising:
acquiring first-key-point information of a first face image;
performing position transformation on the first-key-point information to obtain second-key-point information conforming to a second facial geometric attribute, the second facial geometric attribute being different from a first facial geometric attribute corresponding to the first-key-point information; and
performing facial texture coding processing by utilizing a neural network and the second-key-point information to obtain a second face image,
wherein performing facial texture coding processing by utilizing the neural network and the second-key-point information to obtain the second face image comprises:
generating a mask map of a target face based on the second-key-point information, values of pixels in a face image area in the mask map being a first predetermined value, values of pixels outside the face image area being a second predetermined value, and the face image area being defined by each second key point describing a facial contour;
fusing the mask map and the first face image to generate a fused face image, the face image area in the first face image being reserved in the fused face image;
generating a contour map of geometric attributes of the target face based on the second-key-point information, values of pixels on a contour line of each part in the contour map being a third predetermined value, values of pixels other than the pixels on the contour line of each part being a fourth predetermined value, and the contour line of each part being defined by second key points describing each face part; and
inputting the fused face image and the contour map into the neural network for facial texture coding to obtain the second face image.

16. The non-transitory computer storage medium of claim 15, wherein the computer-executable instructions are further run to implement operations comprising:
adjusting the first face image based on the second-key-point information to obtain a third face image; and
fusing the second face image and the third face image to obtain a fourth face image.

17. The non-transitory computer storage medium of claim 16, wherein the computer-executable instructions are further run to implement operations comprising:

replacing the first face image with the fourth face image or the second face image.

18. The non-transitory computer storage medium of claim 15, wherein the first face image is contained in a predetermined image, and the computer-executable instructions are further run to implement operations comprising:

fusing a fourth face image with a background area other than the first face image in the predetermined image to generate an updated image.

* * * * *